(12) United States Patent
Liu (10) Patent No.: US 12,271,070 B2
(45) Date of Patent: Apr. 8, 2025

(54) DISPLAY PANEL MANUFACTURING DEVICE AND CLEANING METHOD

(71) Applicants: HKC CORPORATION LIMITED, Shenzhen (CN); CHONGQING HKC OPTOELECTRONICS TECHNOLOGY CO., LTD., Chongqing (CN)

(72) Inventor: Chongyang Liu, Chongqing (CN)

(73) Assignees: HKC CORPORATION LIMITED, Shenzhen (CN); CHONGQING HKC OPTOELECTRONICS TECHNOLOGY CO., LTD., Chongqing (CN)

( * ) Notice: Subject to any disclaimer, the term of this patent is extended or adjusted under 35 U.S.C. 154(b) by 152 days.

(21) Appl. No.: 17/971,633

(22) Filed: Oct. 23, 2022

(65) Prior Publication Data

US 2023/0045666 A1   Feb. 9, 2023

Related U.S. Application Data

(62) Division of application No. 16/313,896, filed on Dec. 28, 2018, now Pat. No. 11,513,378.

(51) Int. Cl.
| | |
|---|---|
| *G02F 1/13* | (2006.01) |
| *B08B 3/08* | (2006.01) |
| *B08B 5/02* | (2006.01) |
| *B08B 11/04* | (2006.01) |
| *B08B 13/00* | (2006.01) |
| *G05D 7/06* | (2006.01) |

(52) U.S. Cl.
CPC .............. *G02F 1/1316* (2021.01); *B08B 3/08* (2013.01); *B08B 5/02* (2013.01); *B08B 11/04* (2013.01); *B08B 13/00* (2013.01); *G02F 1/1303* (2013.01); *G05D 7/0652* (2013.01)

(58) Field of Classification Search
CPC .................................................... G02F 1/1303
See application file for complete search history.

(56) References Cited

U.S. PATENT DOCUMENTS

| | | | | |
|---|---|---|---|---|
| 5,762,749 A | * | 6/1998 | Suzuki | H01L 21/67034 156/345.22 |
| 5,958,146 A | * | 9/1999 | Mohindra | H01L 21/67051 134/25.4 |
| 2002/0170573 A1 | * | 11/2002 | Christenson | H01L 21/67051 134/33 |
| 2006/0011214 A1 | * | 1/2006 | Liu | C11D 3/042 134/2 |
| 2007/0183775 A1 | * | 8/2007 | Mitsuhashi | H01L 21/67051 396/611 |

(Continued)

FOREIGN PATENT DOCUMENTS

| | | | |
|---|---|---|---|
| CN | 206541807 U | * | 10/2017 |
| KR | 20110103924 A | * | 9/2011 |

*Primary Examiner* — Omair Chaudhri (57) ABSTRACT

The present application discloses a display panel manufacturing device and a cleaning method. The display panel manufacturing device includes: a machine table, a working pipeline, a gas supply means and a liquid supply means; a detection means is provided on the machine table; a first automatic valve is provided on a gas supply pipeline; and a second automatic valve is provided on a liquid supply pipeline.

10 Claims, 4 Drawing Sheets

(56) References Cited

U.S. PATENT DOCUMENTS

| | | | | |
|---|---|---|---|---|
| 2007/0240743 A1* | 10/2007 | Hiroe | H01L 21/67017 | 134/94.1 |
| 2010/0236579 A1* | 9/2010 | Araki | H01L 21/67051 | 134/26 |
| 2011/0114120 A1* | 5/2011 | Nuch | H01L 21/67051 | 134/10 |
| 2011/0240601 A1* | 10/2011 | Hashizume | B44C 1/227 | 216/83 |
| 2012/0073609 A1* | 3/2012 | Hashimoto | H01L 21/67051 | 134/26 |
| 2012/0083131 A1* | 4/2012 | An | H01L 21/31105 | 438/734 |
| 2016/0204006 A1* | 7/2016 | Fujii | H01L 21/02057 | 438/747 |
| 2016/0317777 A1* | 11/2016 | Kerber | F16L 11/22 | |
| 2016/0365259 A1* | 12/2016 | Liu | H01L 27/1259 | |
| 2018/0261474 A1* | 9/2018 | Hokaku | H01L 21/67046 | |
| 2020/0041895 A1* | 2/2020 | Janssens | F16K 31/008 | |
| 2020/0273696 A1* | 8/2020 | Hinode | H01L 21/02063 | |
| 2021/0016331 A1* | 1/2021 | Ueda | H01L 21/6715 | |

* cited by examiner

DISPLAY PANEL MANUFACTURING DEVICE AND CLEANING METHOD

CROSS REFERENCE TO RELATED APPLICATIONS

This application is a Divisional of U.S. patent application Ser. No. 16/313,896 filed on Dec. 28, 2018. The present application claims priority to the Chinese Patent Application No. CN 201811158805.3, filed to the Chinese Patent Office on Sep. 30, 2018, and entitled "DISPLAY PANEL MANUFACTURING DEVICE AND CLEANING METHOD" which is incorporated herein by reference in its entirety.

TECHNICAL FIELD

The present application relates to the technical field of display, and in particular to a display panel manufacturing device and a cleaning method.

BACKGROUND

The statements in this section merely provide background information related to the present application and may not constitute prior art.

Along with the development and progress of science and technology, a Liquid Crystal Display (LCD) has become a mainstream display product and is widely applied because of hot points such as a thin body, power saving and low radiation. It is known by an inventor that most LCDs are backlight type LCDs and each LCD includes a liquid crystal panel and a backlight module. A working principle of the liquid crystal panel is to place liquid crystal molecules into two parallel glass substrates and apply a drive voltage onto the two glass substrates to control rotation directions of the liquid crystal molecules, thereby refracting light rays of the backlight module to generate a pattern.

Among them, a Thin Film Transistor-Liquid Crystal Display (TFT-LCD) has gradually dominated the display field till now because of properties such as low power consumption, excellent pattern quality and high production yield. Likewise, the TFT-LCD includes a liquid crystal panel and a backlight module; the liquid crystal panel includes a Color Filter Substrate (CF-Substrate), a Thin Film Transistor Substrate (TFT Substrate) and a mask; and a transparent conductive thin film is respectively provided at opposite insides of the CF substrate and the TFT substrate.

During an LCD manufacturing process, a discharge port or an air outlet of some pipeline on a manufacturing device is easily attached by a drug liquid to crystallize and then the discharge port or the air outlet is blocked. As a result, the stability of a display panel manufacture procedure is seriously affected, the yield of a display panel is reduced and at last the cost is increased.

Technical Solutions

The present application provides a display panel manufacturing device and a cleaning method to improve the stability of a display panel manufacture procedure.

To this end, the present application provides a display panel manufacturing device, which includes:
a machine table, configured to support and deliver a glass substrate;
a working pipeline, arranged in a first direction of the machine table and configured to convey a material to be acted on the glass substrate;
a gas supply means, communicating with the working pipeline via a gas supply pipeline; and
a liquid supply means, communicating with the working pipeline via a liquid supply pipeline;
where, a detection means configured to detect a state in which the glass substrate is delivered on the machine table is provided on the machine table; a first automatic valve is provided on the gas supply pipeline; a second automatic valve is provided on the liquid supply pipeline; and the detection means is coupled with the first automatic valve and the second automatic valve.

Optionally, the liquid supply means includes a first liquid supply means; the first liquid supply means includes a first liquid inlet and a first manual valve arranged between the first liquid inlet and the second automatic valve; the first liquid inlet and the first manual valve are arranged on the liquid supply pipeline; and the first liquid supply means outputs a first feed liquid to the working pipeline via the liquid supply pipeline.

Optionally, the liquid supply means includes a second liquid supply means; the second liquid supply means includes a second liquid inlet and a second manual valve arranged between the second liquid inlet and the second automatic valve; the second liquid inlet and the second manual valve are arranged on the liquid supply pipeline; and the second liquid supply means outputs a second feed liquid to the working pipeline via the liquid supply pipeline.

Optionally, the gas supply means includes a gas inlet, a pressure regulating valve and a third manual valve; the gas inlet, the pressure regulating valve and the third manual valve are arranged on the gas supply pipeline; the pressure regulating valve is close to the gas inlet; the third manual valve is close to the working pipeline; the first automatic valve is located between the pressure regulating valve and the third manual valve; and the gas supply means outputs a compressed gas to the working pipeline via the gas supply pipeline.

Optionally, one side, close to the machine table, of the working pipeline is provided with an air blade port; a distance from one end, close to the machine table, of the working pipeline to the machine table is greater than a thickness of the glass substrate; the air blade port is a long stripped opening; directions that the air blade port and the working pipeline are provided are consistent; and a length of the air blade port is greater than a length of the glass substrate in a direction corresponding to the air blade port, and is smaller than a length of the working pipeline.

Optionally, a distance from one end, close to the machine table, of the working pipeline to the machine table is greater than a thickness of the glass substrate; a baffle plate for dividing the working pipeline into two independent pipelines is arranged inside the working pipeline; the working pipeline includes a first pipeline and a second pipeline; one side, close to the machine table, of the first pipeline is provided with an air blade port; one side, close to the machine table, of the second pipeline is provided with a group of through holes; and the first pipeline and the second pipeline do not work simultaneously.

To this end, the present application further provides a display panel manufacturing device, which includes: a machine table, configured to support and deliver a glass substrate;
a working pipeline, arranged in a first direction of the machine table and configured to convey a material to be acted on the glass substrate, where one side, close to the machine table, of the working pipeline is provided with an air blade port, a distance from one end, close to the machine table, of the working pipeline to the machine table is greater than a thickness of the glass substrate, the air blade port is a long stripped opening, directions that the air blade port and the working pipeline are provided are consistent, and a length of the air blade port is greater than a length of the glass substrate in a direction corresponding to the air blade port, and is smaller than a length of the working pipeline;

a gas supply means, communicating with the working pipeline via a gas supply pipeline, where the gas supply means includes a gas inlet, a pressure regulating valve, a first automatic valve and a third manual valve, the gas inlet, the pressure regulating valve, the first automatic valve and the third manual valve are arranged on the gas supply pipeline, the pressure regulating valve is close to the gas inlet, the third manual valve is close to the working pipeline, the first automatic valve is located between the pressure regulating valve and the third manual valve, and the gas supply means outputs a compressed gas to the working pipeline via the gas supply pipeline; and a liquid supply means, communicating with the working pipeline via a liquid supply pipeline, where a second automatic valve is arranged on the liquid supply pipeline;

the liquid supply means includes a first liquid supply means; the first liquid supply means includes a first liquid inlet and a first manual valve arranged between the first liquid inlet and the second automatic valve; the first liquid inlet and the first manual valve are arranged on the liquid supply pipeline; and the first liquid supply means outputs a first feed liquid to the working pipeline via the liquid supply pipeline;

the liquid supply means includes a second liquid supply means; the second liquid supply means includes a second liquid inlet and a second manual valve arranged between the second liquid inlet and the second automatic valve; the second liquid inlet and the second manual valve are arranged on the liquid supply pipeline; and the second liquid supply means outputs a second feed liquid to the working pipeline via the liquid supply pipeline; and a detection means configured to detect a state in which the glass substrate is delivered on the machine table is provided on the machine table; and the detection means is coupled with the first automatic valve and the second automatic valve.

To this end, the present application provides a cleaning method including the above-mentioned display panel manufacturing device, which includes:

a detection means detects an operating state of a machine table and outputs a control signal; and a first automatic valve and a second automatic valve are controlled according to the control signal to be opened or closed.

Optionally, the operating state includes a substrate loaded state; and when the detection means detects that the machine table is in the substrate loaded state, the method that a first automatic valve and a second automatic valve are controlled according to the control signal to be opened or closed includes:

the detection means outputs the control signal to the first automatic valve to open the gas supply means; and the detection means outputs the control signal to the second automatic valve to close the liquid supply means;

where, the gas supply means conveys a compressed gas to a working pipeline; the compressed gas is blown to a surface of the glass substrate via an air blade port; and the compressed gas blows off a residual drug liquid on the glass substrate.

Specifically, the drug liquid includes an etching liquid.

Optionally, the operating state includes a no-load state; and when the detection means detects that the machine table is in the no-load state, the method that a first automatic valve and a second automatic valve are controlled according to the control signal to be opened or closed includes:

the detection means outputs the control signal to the first automatic valve to close the gas supply means; and the detection means outputs the control signal to the second automatic valve to open the liquid supply means;

where, the first manual valve is in a closed state, the second liquid supply means conveys a second feed liquid to the working pipeline, the second feed liquid is flowed to the machine table from the air blade port, and the second feed liquid is deionized water.

When a transparent conductive thin film on the glass substrate is etched with a wet method, an oxalic acid is used to etch the transparent conductive thin film. Since the oxalic acid is easily crystallized after being reacted with the transparent conductive thin film, after the gas supply means supplies a gas to the working pipeline and when the etched glass substrate is treated by the gas in the working pipeline, the residual drug liquid on the glass substrate is splashed easily to be absorbed to an outlet of the working pipeline and crystallized on the outlet. As a result, the outlet is blocked and a gas pressure in the blocked working pipeline becomes large, so that a force acted on the glass substrate is large and a photoresist on the glass substrate is easily fallen off. In the present application, the detection means is provided, the detection means is coupled with the first automatic valve of the gas supply means and the second automatic valve of the liquid supply means, and the detection means may control a working state of the first automatic valve or the second automatic valve, thereby controlling a working state of the gas supply means or the liquid supply means; when a cleaning liquid is provided to the working pipeline by the liquid supply means, the machine table and the working pipeline may be cleaned, so that a crystallization velocity on the outlet of the working pipeline is slowed down or crystals on the outlet of the working pipeline are removed; and therefore, the occurrence of a condition in which the working pipeline is crystallized is reduced, the photoresist on the glass substrate is reduced to be fallen off and at last the stability of the display panel manufacture procedure is improved and the production cost of the display panel is saved.

BRIEF DESCRIPTION OF THE DRAWINGS

The drawings are included to provide further understanding of embodiments of the present application, which constitute a part of the specification and illustrate the embodiments of the present application, and describe the principles of the present application together with the text description. Apparently, the accompanying drawings in the following description show merely some embodiments of the present application, and a person of ordinary skill in the art may still derive other accompanying drawings from these accompanying drawings without creative efforts. In the accompanying drawings.

DETAILED DESCRIPTION

The specific structure and function details disclosed herein are merely representative, and are intended to describe exemplary embodiments of the present application. However, the present application can be specifically embodied in many alternative forms, and should not be interpreted to be limited to the embodiments described herein.

In the description of the present application, it should be understood that, orientation or position relationships indicated by the terms "center", "transversal", "upper", "lower", "left", "right", "vertical", "horizontal", "top", "bottom", "inner", "outer", etc. are based on the orientation or position relationships as shown in the drawings, for ease of the description of the present application and simplifying the description only, rather than indicating or implying that the indicated device or element must have a particular orientation or be constructed and operated in a particular orientation. Therefore, these terms should not be understood as a limitation to the present application. In addition, the terms such as "first" and "second" are merely for a descriptive purpose, and cannot be understood as indicating or implying a relative importance, or implicitly indicating the number of the indicated technical features. Hence, the features defined by "first", "second" can explicitly or implicitly include one or more of the features. In the description of the present application, "a plurality of" means two or more, unless otherwise stated. In addition, the term "include" and any variations thereof are intended to cover a non-exclusive inclusion.

In the description of the present application, it should be understood that, unless otherwise specified and defined, the terms "install", "connected with", "connected to" should be comprehended in a broad sense. For example, these terms may be comprehended as being fixedly connected, detachably connected or integrally connected; mechanically connected or coupled; or directly connected or indirectly connected through an intermediate medium, or in an internal communication between two elements. The specific meanings about the foregoing terms in the present application may be understood by those skilled in the art according to specific circumstances.

The terms used herein are merely for the purpose of describing the specific embodiments, and are not intended to limit the exemplary embodiments. As used herein, the singular forms "a", "an" are intended to include the plural forms as well, unless otherwise indicated in the context clearly. It will be further understood that the terms "comprise" and/or "include" used herein specify the presence of the stated features, integers, steps, operations, elements and/or components, but do not preclude the presence or addition of one or more other features, integers, steps, operations, elements, components and/or combinations thereof.

The present application will be further described in combination with the accompanying drawings and embodiments.

Figure 1:
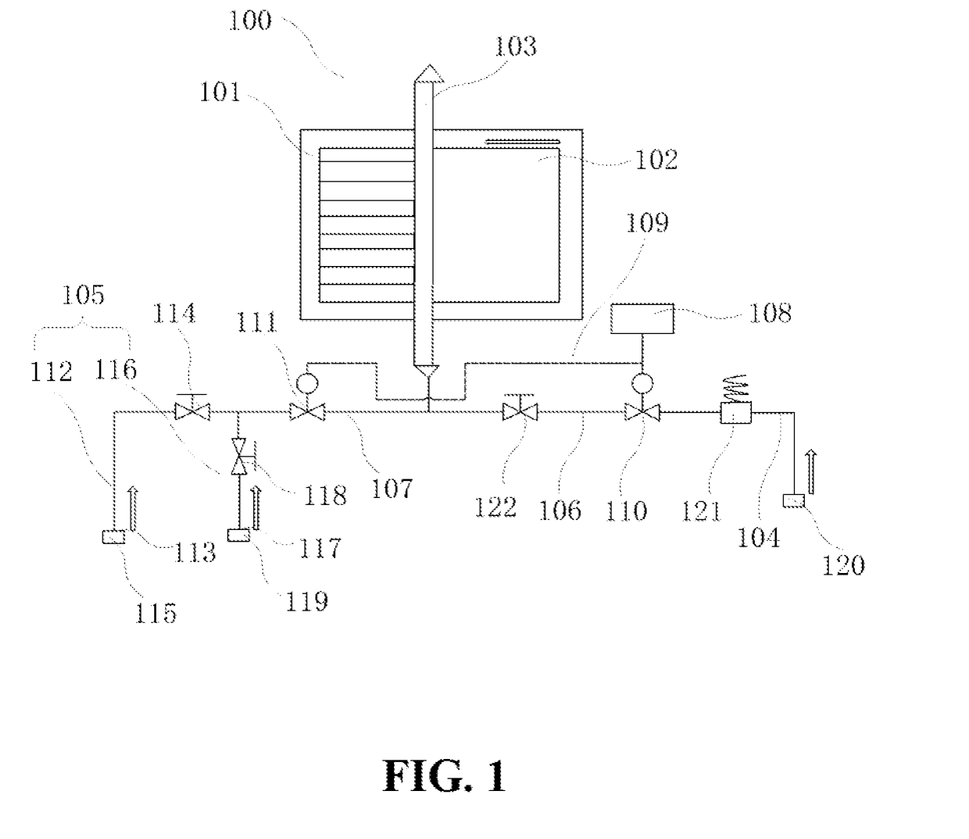
FIG. 1 is a schematic diagram of a manufacturing device according to an embodiment of the present application.
Figure 2:
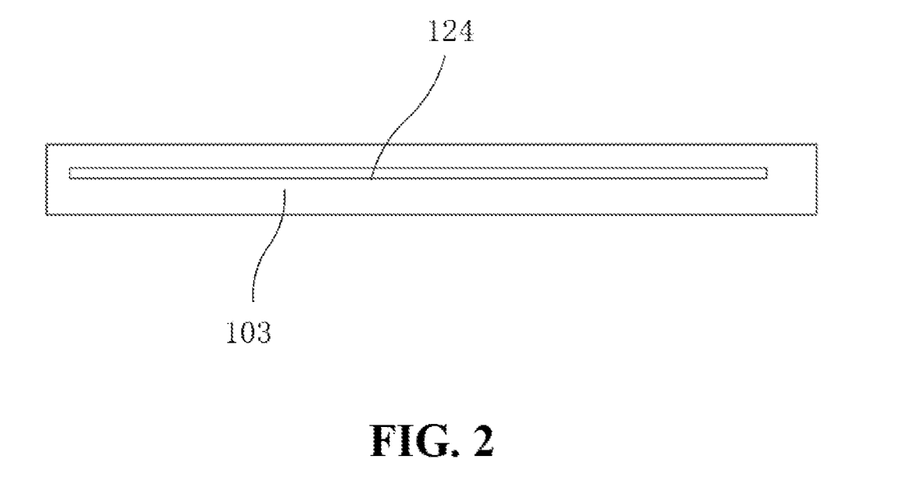
FIG. 2 is a schematic diagram of a working pipeline according to an embodiment of the present application.
Figure 3:
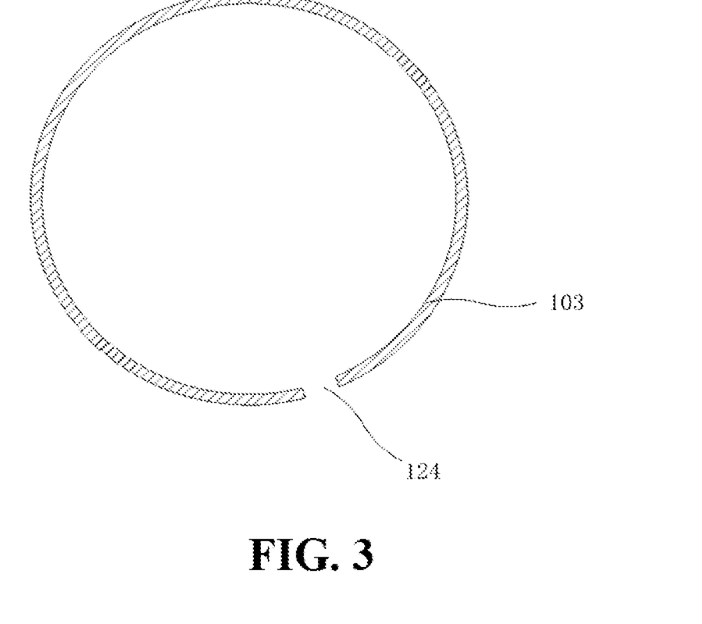
FIG. 3 is a cross-sectional schematic diagram of a working pipeline according to an embodiment of the present application.

As shown in FIG. 1 to FIG. 3, an embodiment of the present application discloses a display panel manufacturing device 100, which includes:

a machine table 101, configured to support and deliver a glass substrate 102;

a working pipeline 103, arranged in a first direction of the machine table 101 and configured to convey a material to be acted on the glass substrate 102;

a gas supply means 104, communicating with the working pipeline 103 via a gas supply pipeline 106; and a liquid supply means 105, communicating with the working pipeline 103 via a liquid supply pipeline 107;

where, a detection means 108 configured to detect a state in which the glass substrate 102 is delivered on the machine table 101 is provided on the machine table 101; a first automatic valve 110 is provided on the gas supply pipeline 106; a second automatic valve 111 is provided on the liquid supply pipeline 107; and the detection means 108 is coupled with the first automatic valve 110 and the second automatic valve 111. In the present application, the first direction is above the machine table.

When a transparent conductive thin film on the glass substrate 102 is etched with a wet method, an oxalic acid is used to etch the transparent conductive thin film. Since the oxalic acid is easily crystallized after being reacted with the transparent conductive thin film, after the gas supply means 104 supplies a gas to the working pipeline 103 and when the etched glass substrate 102 is treated by the gas in the working pipeline 103, the residual drug liquid on the glass substrate 102 is splashed easily to be absorbed to an outlet of the working pipeline 103 and crystallized on the outlet. As a result, the outlet is blocked and a gas pressure in the blocked working pipeline 103 becomes large, so that a force acted on the glass substrate 102 is large and a photoresist on the glass substrate 102 is easily fallen off. In the present application, the detection means 108 is provided, the detection means 108 is coupled with the first automatic valve 110 of the gas supply means 104 and the second automatic valve 111 of the liquid supply means 105, and the detection means 108 may control a working state of the first automatic valve 110 or the second automatic valve 111, thereby controlling a working state of the gas supply means 104 or the liquid supply means 105; when a cleaning liquid is provided to the working pipeline 103 by the liquid supply means 105, the machine table 101 and the working pipeline 103 may be cleaned, so that a crystallization velocity on the outlet of the working pipeline 103 is slowed down or crystals on the outlet of the working pipeline 103 are removed; and therefore, the occurrence of a condition in which the working pipeline 103 is crystallized is reduced, the photoresist on the glass substrate 102 is reduced to be fallen off, and at last the stability of the display panel manufacture procedure is improved and the production cost of the display panel is saved.

In this embodiment, optionally, the liquid supply means 105 includes a first liquid supply means 112; the first liquid supply means 112 includes a first liquid inlet 113 and a first manual valve 114 arranged between the first liquid inlet 113 and the second automatic valve 111; the first liquid inlet 113 and the first manual valve 114 are arranged on the liquid supply pipeline 107; and the first liquid supply means 112 outputs a first feed liquid 115 to the working pipeline 103 via the liquid supply pipeline 107.

When the second automatic valve 111 receives a signal of the coupled detection means 108, the first liquid supply means 112 is opened via the second automatic valve 111; the first manual valve 114 is arranged on the liquid supply pipeline 107 and between the first liquid inlet 113 and the first manual valve 114; and according to a demand of the working pipeline 103, the magnitude of a flow of the first feed liquid 115 that is input to the liquid supply pipeline by the first liquid inlet 113 is regulated by the first manual valve 114.

Specifically, the first liquid supply means 112 is opened to use when the machine table 101 is maintained, thereby cleaning the working pipeline 103 and the machine table 101 simultaneously; and the first feed liquid 115 includes a hydrochloric acid or other acidic liquids.

In this embodiment, optionally, one side, close to the machine table 101, of the working pipeline 103 is provided with an air blade port 124; a distance from one end, close to the machine table 101, of the working pipeline 103 to the machine table 101 is greater than a thickness of the glass substrate 102; the air blade port 124 is a long stripped opening; directions that the air blade port 124 and the working pipeline 103 are provided are consistent; and a length of the air blade port 124 is greater than a length of the glass substrate 102 in a direction corresponding to the air blade port 124, and is smaller than a length of the working pipeline 103.

The glass substrate 102 moves between the working pipeline 103 and the machine table 101 when the machine table 101 works; and the distance from one end, close to the machine table 101, of the working pipeline 103 to the machine table 101 should be greater than the thickness of the glass substrate 102 for fear that the glass substrate 102 is blocked or cannot be passed through below the working pipeline 103 to cause the damage of the glass substrate 102 or the working pipeline 103. In addition, the length of the air blade port 124 is greater than that of the glass substrate 102 in the direction corresponding to the air blade port 124, so it may be assured that the glass substrate 102 can completely contact the air from the air blade port 124 when passing through the working pipeline 103 and that a great deal of drug liquid is prevented from being remained after the glass substrate 102 passes through the working pipeline 103 to corrode the photoresist and affect a manufacture procedure of the glass substrate 102. The length of the air blade port 124 should be smaller than that of the working pipeline 103 to reduce the idleness. If the length of the air blade port 124 is equal to or is greater than that of the working pipeline 103, most air blades are idle and a great deal of compressed air is wasted. Besides, the exceeded working pipeline 103 is exposed outside to affect the operation of a worker on a machine, thus reducing the production efficiency Specifically, the working pipeline 103 is 2 m long and an opening of the air blade port 124 is 2 mm wide.

Figure 4:
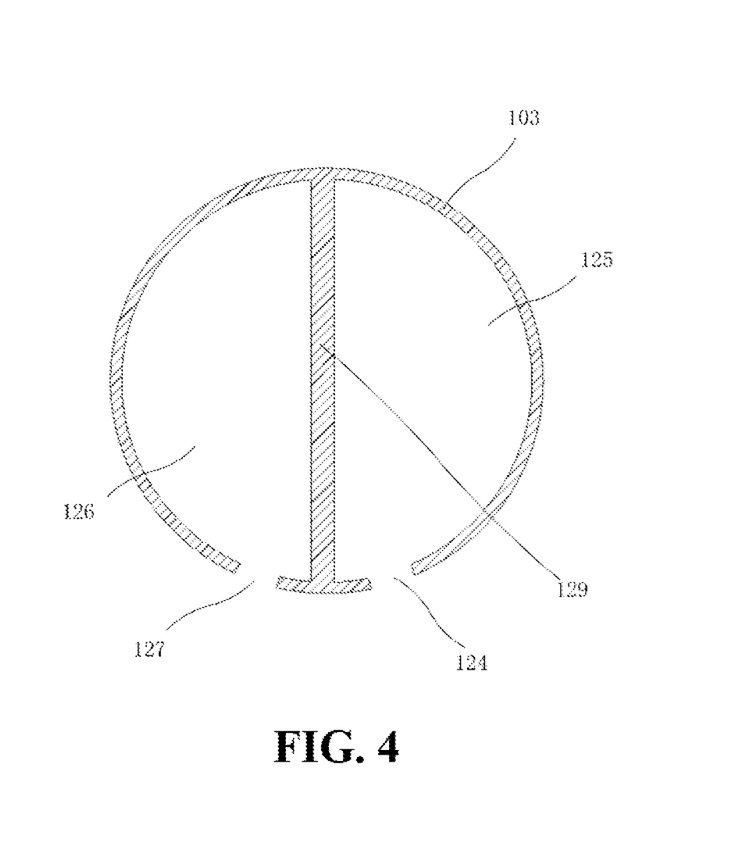
FIG. 4 is a cross-sectional schematic diagram of another working pipeline according to an embodiment of the present application.
Figure 5:
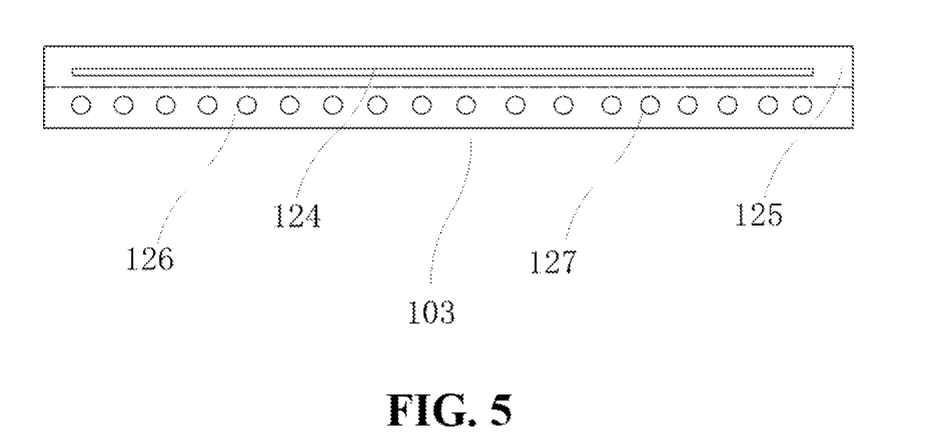
FIG. 5 is a schematic diagram of an opening place of a working pipeline according to an embodiment of the present application.

Referring to FIG. 4 and FIG. 5, the difference from the above embodiment lies in: a distance from one end, close to the machine table 101, of the working pipeline 103 to the machine table 101 is greater than a thickness of the glass substrate 102; a baffle plate 129 for dividing the working pipeline 103 into two independent pipelines is arranged inside the working pipeline 103; the working pipeline 103 includes a first pipeline 125 and a second pipeline 126; one side, close to the machine table 101, of the first pipeline 125 is provided with an air blade port 124; one side, close to the machine table 101, of the second pipeline 126 is provided with a group of through holes 127; and the first pipeline 125 and the second pipeline 126 do not work simultaneously.

The glass substrate 102 moves between the working pipeline 103 and the machine table 101 when the machine table 101 works; and the distance from the end, close to the machine table 101, of the working pipeline 103 to the machine table 101 should be greater than the thickness of the glass substrate 102 for fear that the glass substrate 102 is blocked or cannot be passed through to cause the damage of the glass substrate 102 or the working pipeline 103. By arranging the baffle plate 129 inside the working pipeline 103, the working pipeline 103 is divided into two components that are the first pipeline 125 and the second pipeline 126 respectively; the first pipeline 125 is provided with the air blade port 124; and the second pipeline 126 is provided with the through holes 127.

A main function of the first pipeline 125 is to enable the compressed air 123 provided by the gas supply means 104 to blow away the residual drug liquid on the glass substrate 102 via the air blade port 124 and prevent the residual drug liquid from being remained on the glass substrate 102 to corrode the photoresist or other structures to fall off. A function of the second pipeline 126 is to spray out a liquid provided by the liquid supply means 105 via the through holes 127. If an etching liquid is provided by the liquid supply means 105, the etching liquid may be sprayed via the through holes 127 to etch the glass substrate 102. If a cleaning liquid is provided by the liquid supply means 105, the machine table 101 may be cleaned by the cleaning liquid that is sprayed out via the through holes 127; and furthermore, the working pipeline 103 is also cleaned. With the above two pipelines, the multifunction of the working pipeline 103 is implemented; and moreover, the two groups of pipelines are switched to work and do not affect to each other.

Figure 6:
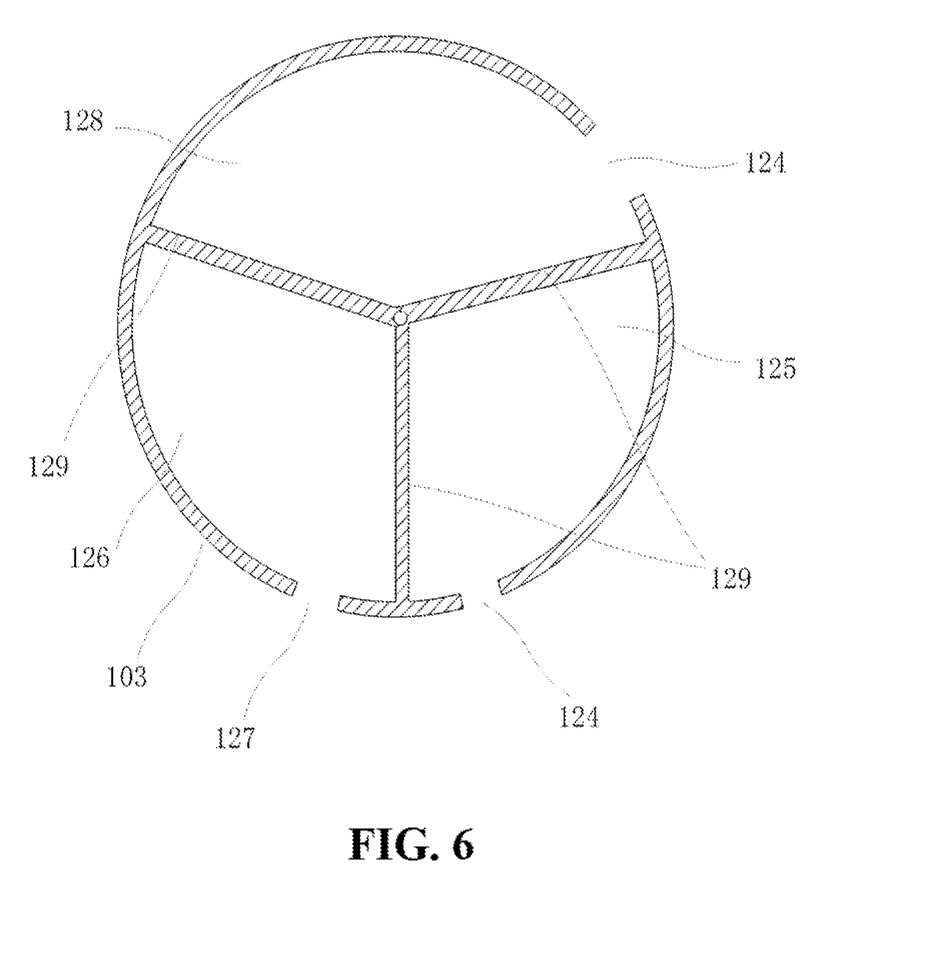
FIG. 6 is a cross-sectional schematic diagram of another working pipeline according to an embodiment of the present application.

Referring to FIG. 6, the difference from the above embodiment lies in: the working pipeline 103 may further be divided by three baffle plates 129 into a first pipeline 125, a second pipeline 126 and a third pipeline 128 that do not communicate with each other; the first pipeline 125 is provided with a through hole 127, the second pipeline 126 is provided with an air blade port 124 and the third pipeline 128 is provided with the air blade port 124 and the through hole 127; the working pipeline 103 may be rotated with a pipeline center as a center; and according to different demands, the working pipeline 103 may be respectively regulated so that the through hole 127 of the first pipeline 125 corresponds to the machine table 101, the air blade port 124 of the second pipeline 126 corresponds to the machine table 101 or the through hole 127 and the air blade port 124 of the third pipeline 128 correspond to the machine table 101. Therefore, the multifunction of the working pipeline 103 is implemented, and the three groups of pipelines are switched to work and do not affect to each other.

As another embodiment of the present application, referring to FIG. 1, the difference from the above embodiment lies in: the liquid supply means 105 further includes a second liquid supply means 116; the second liquid supply means 116 includes a second liquid inlet 117 and a second manual valve 118 arranged between the second liquid inlet 117 and the second automatic valve 111; the second liquid inlet 117 and the second manual valve 118 are arranged on the liquid supply pipeline 107; and the second liquid supply means 116 outputs a second feed liquid 119 to the working pipeline 103 via the liquid supply pipeline 107.

When the second automatic valve 111 receives a signal of the coupled detection means 108, the second liquid supply means 116 may further be opened via the second automatic valve 111; the second manual valve 118 is arranged on the liquid supply pipeline 107 and between the second liquid inlet 117 and the second manual valve 111; and according to a demand of the working pipeline 103, the magnitude of a flow of the second feed liquid 119 that is input to the liquid supply pipeline by the second liquid inlet 117 is regulated by the second manual valve 114.

Specifically, the second liquid supply means 116 is opened to use when the drug liquid is changed in other working stages of the machine table 101 or the glass substrate 102 is still in other working stages, and the second feed liquid 119 includes deionized water.

As another embodiment of the present application, referring to FIG. 1, the difference from the above embodiment lies in: the gas supply means 104 includes a gas inlet 120, a pressure regulating valve 121 and a third manual valve 122; the gas inlet 120, the pressure regulating valve 121 and the third manual valve 122 are arranged on the gas supply pipeline 106; the pressure regulating valve 121 is close to the gas inlet 120; the third manual valve 122 is close to the working pipeline 102; the first automatic valve 122 is located between the pressure regulating valve 121 and the third manual valve 122; and the gas supply means 102 outputs a compressed gas 123 to the working pipeline 103 via the gas supply pipeline 106.

When the first automatic valve 110 receives a signal of the coupled detection means 108, the gas supply means 104 is opened via the first automatic valve 110. The pressure regulating valve 121 on the gas supply pipeline 106 is used for regulating a pressure of the compressed gas 123 input to the gas supply pipeline from the gas inlet 120, and the third manual valve 122 is used for regulating a flow of the compressed gas 123 so that the compressed gas 123 input to the working pipeline 103 meets the demand, is sufficient to blow away the residual drug liquid on the glass substrate 102 and can further prevent a photoresist on the glass substrate 102 from falling off due to an excessively large air force.

Specifically, the compressed gas 123 includes clean compressed air.

As another embodiment of the present application, referring to FIG. 1 to FIG. 3 the present application discloses a display panel manufacturing device 100, which includes:
a machine table 101, configured to support and deliver a glass substrate 102;
a working pipeline 103, arranged in a first direction of the machine table 101 and configured to convey a material to be acted on the glass substrate 102, where one side, close to the machine table 101, of the working pipeline 103 is provided with an air blade port 124; a distance from one end, close to the machine table 101, of the working pipeline 103 to the machine table 101 is greater than a thickness of the glass substrate 102; the air blade port 124 is a long stripped opening: directions that the air blade port 124 and the working pipeline 103 are provided are consistent; and a length of the air blade port 124 is greater than a length of the glass substrate 102 in a direction corresponding to the air blade port 124, and is smaller than a length of the working pipeline 103;
a gas supply means 104, communicating with the working pipeline 103 via a gas supply pipeline 106, where the gas supply means 104 includes a gas inlet 120, a pressure regulating valve 121, a first automatic valve 110 and a third manual valve 122, the gas inlet 120, the pressure regulating valve 121, the first automatic valve 110 and the third manual valve 122 are arranged on the gas supply pipeline 106, the pressure regulating valve 121 is close to the gas inlet 120, the third manual valve 122 is close to the working pipeline 103, the first automatic valve 110 is located between the pressure regulating valve 121 and the third manual valve 122, and the gas supply means 104 outputs a compressed gas 123 to the working pipeline 103 via the gas supply pipeline 106; and
a liquid supply means 105, communicating with the working pipeline 103 via a liquid supply pipeline 107, where a second automatic valve 111 is arranged on the liquid supply pipeline 107;
the liquid supply means 105 includes a first liquid supply means 112; the first liquid supply means 112 includes a first liquid inlet 113 and a first manual valve 114 arranged between the first liquid inlet 113 and the second automatic valve 111; the first liquid inlet 113 and the first manual valve 114 are arranged on the liquid supply pipeline 107; and the first liquid supply means 112 outputs a first feed liquid 115 to the working pipeline 103 via the liquid supply pipeline 107;
the liquid supply means 105 includes a second liquid supply means 116; the second liquid supply means 116 includes a second liquid inlet 117 and a second manual valve 118 arranged between the second liquid inlet 117 and the second automatic valve 111; the second liquid inlet 117 and the second manual valve 118 are arranged on the liquid supply pipeline 107; and the second liquid supply means 116 outputs a second feed liquid 119 to the working pipeline 103 via the liquid supply pipeline 107; and
a detection means 108 configured to detect a state in which the glass substrate 102 is delivered on the machine table 101 is provided on the machine table 101; and the detection means 108 is coupled with the first automatic valve 110 and the second automatic valve 111.

By arranging the detection means 108, an operating state in which the glass substrate 102 is delivered on the machine table 101 is detected. The detection means 108 is coupled with the first automatic valve 110 of the gas supply means 104 and the second automatic valve 111 of the liquid supply means 105. According to a detected operating state of the machine table 101, the detection means 108 may control a working state of the first automatic valve 110 or the second automatic valve 111 by transmitting a control signal 109 to the first automatic valve 110 or the second automatic valve 111, thereby controlling a working state of the gas supply means 104 or the liquid supply means 105. When a cleaning liquid is provided to the working pipeline 103 by the liquid supply means 105, the machine table 101 and the working pipeline 103 may be cleaned, so that a crystallization velocity on an outlet of the working pipeline 103 is slowed down or crystals on the outlet of the working pipeline 103 are removed; and therefore, the occurrence of a condition in which the working pipeline 103 is crystallized is reduced, the photoresist on the glass substrate 102 is reduced to be fallen off, and at last the cost is saved and the stability of the display panel manufacture procedure is improved.

When the first automatic valve 110 receives a signal of the coupled detection means 108, the gas supply means 104 is opened via the first automatic valve 110. The pressure regulating valve 121 on the gas supply pipeline 106 is used for regulating a pressure of the compressed gas 123 input to the gas supply pipeline from the gas inlet 120, and the third manual valve 122 is used for regulating a flow of the compressed gas 123 so that the compressed gas 123 input to the working pipeline 103 meets the demand, is sufficient to blow away the residual drug liquid on the glass substrate 102 and can further prevent a photoresist on the glass substrate 100 from falling off due to an excessively large air force.

When the second automatic valve 111 receives a signal of the coupled detection means 108, the first liquid supply means 112 is opened via the second automatic valve 111. The first manual valve 114 is arranged on the liquid supply pipeline 107 and between the first liquid inlet 113 and the first manual valve 114. According to a demand of the working pipeline 103, the magnitude of a flow of the first feed liquid 115 that is input to the liquid supply pipeline by the first liquid inlet 113 is regulated by the first manual valve 114. The first feed liquid 115 includes a hydrochloric acid solution or other acidic solutions. After the first feed liquid 115 gets out of the air blade port 124, the cleaning on the machine table 101 is implemented and the cleaning on the working pipeline 103 and the air blade port 101 in itself is also implemented. Therefore, an air outlet is prevented from being blocked by drug crystals splashed and attached on the glass substrate 102 to change an air-out direction of the air blade port 124 and an air force applied to the glass substrate 102, the normal work of the working pipeline 103 is guaranteed and a structure including the photoresist on the glass substrate 102 is prevented from being damaged.

When the second automatic valve 111 receives the signal of the coupled detection means 108, the second liquid supply means 116 may further be opened via the second automatic valve 111. The second manual valve 118 is arranged on the liquid supply pipeline 107 and between the second liquid inlet 117 and the second manual valve 111. According to the demand of the working pipeline 103, the magnitude of the flow of the second feed liquid 119 that is input to the liquid supply pipeline by the second liquid inlet 117 is regulated by the second manual valve 114. The second feed liquid 119 includes deionized water. By charging the deionized water to the working pipeline 103, a drug crystallization time on the air blade port 124 may be alleviated, and the occurrence of a crystallization condition is reduced.

Specifically, a temperature of the deionized water is 35° C. to 45° C. The effect of alleviating the drug crystallization is the best when the temperature of the deionized water is 40° C.

Figure 7:
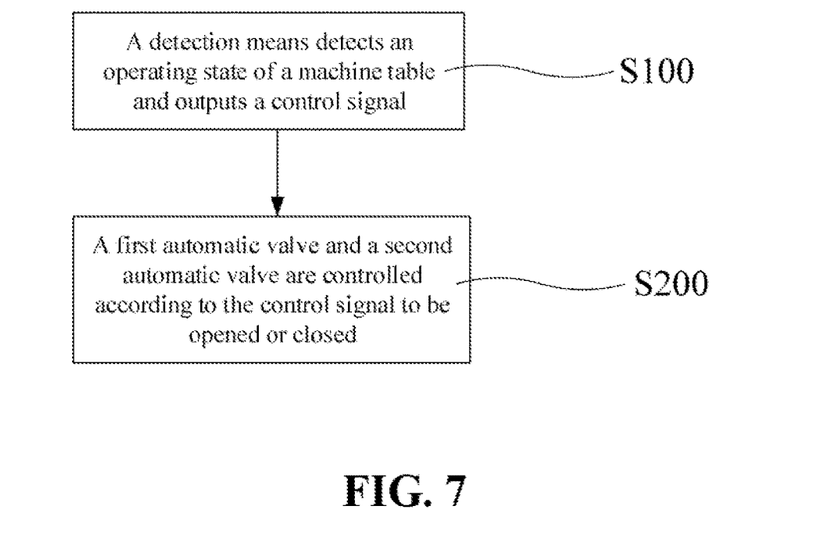
FIG. 7 is a flowchart schematic diagram of a cleaning method according to an embodiment of the present application.
Figure 8:
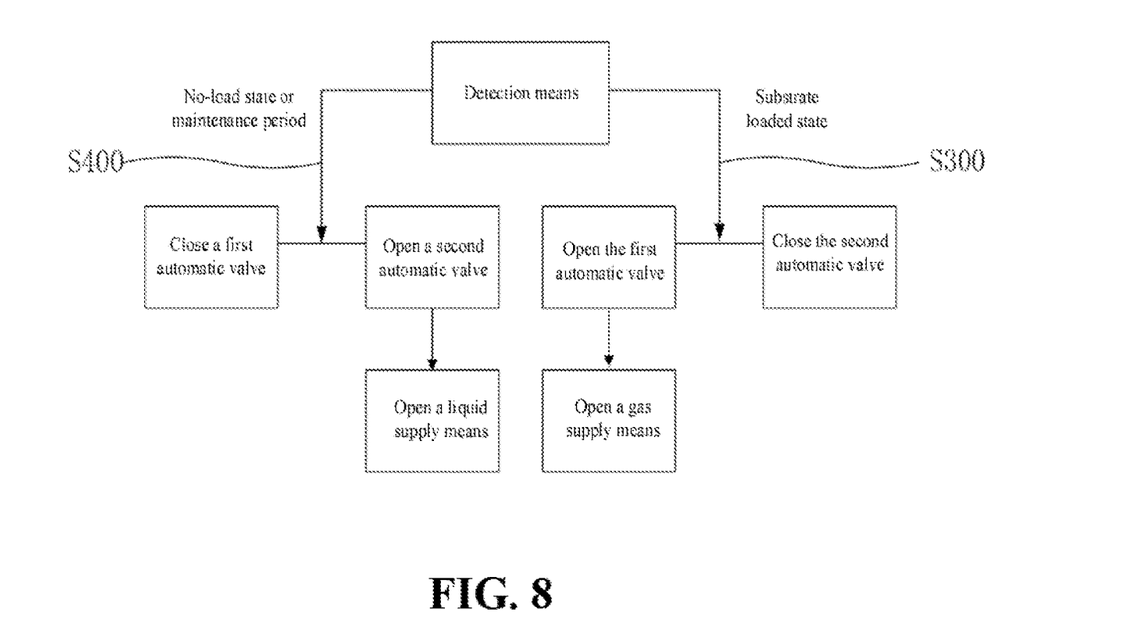
FIG. 8 is a flowchart schematic diagram of another cleaning method according to an embodiment of the present application.

As another embodiment of the present application, referring to FIG. 7 to FIG. 8 the present application discloses a cleaning method including the display panel manufacturing device 100, which includes:

S100: a detection means 108 detects an operating state of a machine table 101 and outputs a control signal 109.

S200: a first automatic valve 110 and a second automatic valve 111 are controlled according to the control signal 109 to be opened or closed.

By detecting the operating state of the machine table 101 and outputting the control signal 109 to control the first automatic valve 110 and the second automatic valve 111 to be opened or closed, the automatic control is implemented, the manpower investment is reduced, and the production cost is saved.

In this embodiment, optionally, the operating state includes a substrate loaded state; and when the detection means 108 detects that the machine table 101 is in the substrate loaded state, the method that a first automatic valve 110 and a second automatic valve 111 are controlled according to the control signal 109 to be opened or closed includes S300:

the detection means 108 outputs the control signal 109 to the first automatic valve 110 to open the gas supply means 104; and the detection means 108 outputs the control signal 109 to the second automatic valve 111 to close the liquid supply means 105;

where, the gas supply means 104 conveys a gas to a working pipeline 103; the gas is blown to a surface of the glass substrate 102 via an air blade port 124; and the gas blows off a residual drug liquid on the glass substrate 102. The drug liquid includes an etching liquid.

The machine table 101 delivers the glass substrate 102 to a second direction of the working pipeline 103 in the substrate loaded state. At this moment, the residual drug liquid after etching is on the glass substrate 102, so it is necessary to provide a compressed gas 123 via the gas supply means 104 to blow the surface of the substrate 102 and to remove the residual drug liquid. Therefore, the detection means 108 needs to output the control signal 109 to the first automatic valve 110 to open the gas supply means 104, and simultaneously output the control signal 109 to the second automatic valve 111 to close the liquid supply means 105 at this moment. In the present application, the second direction is below the working pipeline.

In this embodiment, optionally, the operating state includes a no-load state; and when the detection means 108 detects that the machine table 101 is in the no-load state, the method that a first automatic valve 110 and a second automatic valve 111 are controlled according to the control signal 109 to be opened or closed includes S400: the detection means 108 outputs the control signal 109 to the second automatic valve 110 to close the gas supply means 104; and the detection means 108 outputs the control signal 109 to the second automatic valve 111 to open the liquid supply means 105;

where, the first manual valve 114 is in a closed state, the second liquid supply means 116 conveys a second feed liquid 119 to the working pipeline 103, the second feed liquid 119 is flowed to the machine table 101 from the air blade port 124, and the second feed liquid 119 is deionized water.

There is no movement of the glass substrate 102 in the second direction of the working pipeline 103 in the no-load state, because the foregoing residual drug liquid in treatment of the glass substrate 102 is splashed on the air blade port 124 of the working pipeline 103. As the drug liquid is crystallized easily, by inputting the deionized water to the working pipeline 103 via the liquid supply means 105, the crystallization time of the drug liquid on the air blade port 124 may be slowed down, and the occurrence of the crystallization condition is reduced. Therefore, it is necessary to output the control signal 109 to the first automatic valve 110 to close the gas supply means 104 in the no-load state; and meanwhile, the detection means 108 outputs the control signal 109 to the second automatic valve 111 to open the liquid supply means 105.

In this embodiment, optionally, the machine table 101 needs to be maintained at intervals; and when the machine table 101 is maintained, the method that a first automatic valve 110 and a second automatic valve 111 are controlled according to the control signal 109 to be opened or closed includes S400:

the detection means 108 outputs the control signal 109 to the second automatic valve 110 to close the gas supply means 104; and the detection means 108 outputs the control signal 109 to the second automatic valve 111 to open the liquid supply means 105;

where, the second manual valve 118 is in a closed state, the first liquid supply means 112 conveys a first feed liquid 115 to the working pipeline 103, the first feed liquid 115 is flowed to the machine table 101 from the air blade port 124, and the first feed liquid 115 is a hydrochloric acid solution or other acidic solutions.

There is no movement of the glass substrate 102 in the second direction of the working pipeline 103 when the machine table 101 is maintained, because the foregoing residual drug liquid in treatment of the glass substrate 102 is splashed on the air blade port 124 of the working pipeline 103 to crystallize. The crystals seriously affect an air-out direction of the air blade port 124 and a blowing force to the surface of the glass substrate 102, and are easy to cause that the residual drug liquid on the glass substrate 102 is not removed completely or that the photoresist on the glass substrate 102 is fallen off, so it is essential to remove the crystals on the air blade port 124. By conveying the hydrochloric acid solution or the other acidic solutions to the working pipeline 103 via the first liquid supply means 112, the crystals may be effectively removed and the normal work of the air blade port 124 is guaranteed.

Specifically, the first liquid supply means 112 do not need to be provided additionally. When the machine table 101 is maintained, the first liquid supply means 112 is adopted to clean the machine table 101. Therefore, in this embodiment, the first liquid supply means 112 is adopted to clean the working pipeline 103 and the air blade port 124 without additional equipment investment, and thus the production cost is saved.

In the present application, the panel may be a Twisted Nematic (TN) panel, an In-Pane Switching (IPS) panel and a Multi-domain Vertical Alignment (VA) panel, and of course, may also be other types of applicable panels.

The above are further detailed descriptions of the present application in combination with specific preferred implementation manners and should not be deemed as that the specific implementation of the present application is only limited to these descriptions. A person of ordinary skill in the art to which the present invention belongs may further make a plurality of simple deviations or replacements without departing from the concept of the present invention and all should be considered as a scope of protection of the present invention.

What is claimed is:

1. A cleaning method applied to a display panel manufacturing device, the display panel manufacturing device comprising:

a machine table, configured to support and deliver a glass substrate;

a working pipeline, arranged in a first direction of the machine table and configured to convey a material to act on the glass substrate;

a gas supplier, communicating with the working pipeline via a gas supply pipeline; and a liquid supplier, communicating with the working pipeline via a liquid supply pipeline, wherein there is disposed a detector on the machine table that is configured to detect a state in which the glass substrate is delivered on the machine table; a first automatic valve is disposed in the gas supply pipeline; a second automatic valve is disposed in the liquid supply pipeline; and the detector is coupled with the first automatic valve and the second automatic valve; and the cleaning method comprises:

detecting, by the detector, an operating state of the machine table and outputting control signals; and controlling the first automatic valve and the second automatic valve to be opened or closed according to the respective control signals for the first automatic valve and the second automatic valve;

wherein a vertical distance from one end of the working pipeline adjacent to the machine table to the machine table is greater than a thickness of the glass substrate; a baffle plate dividing the working pipeline into two independent pipelines is arranged inside the working pipeline so that the working pipeline comprises a first pipeline and a second pipeline; wherein there is defined an air blade port in a side of the first pipeline adjacent to the machine table; and wherein there is defined a group of through holes in a side of the second pipeline adjacent to the machine table.

2. The cleaning method according to claim 1, wherein the liquid supplier comprises a first liquid supplier; the first liquid supplier comprises a first liquid inlet and a first manual valve arranged between the first liquid inlet and the second automatic valve; the first liquid inlet and the first manual valve are disposed in the liquid supply pipeline; and the first liquid supplier is configured to output a first feed liquid to the working pipeline via the liquid supply pipeline.

3. The cleaning method according to claim 1, wherein the liquid supplier comprises a second liquid supplier; the second liquid supplier comprises a second liquid inlet and a second manual valve arranged between the second liquid inlet and the second automatic valve; the second liquid inlet and the second manual valve are disposed in the liquid supply pipeline; and the second liquid supplier is operative to output a second feed liquid to the working pipeline via the liquid supply pipeline.

4. The cleaning method according to claim 1, wherein the gas supplier includes a gas inlet, a pressure regulating valve, and a third manual valve; the gas inlet, the pressure regulating valve, and the third manual valve are disposed in the gas supply pipeline; the pressure regulating valve is disposed adjacent to the gas inlet; the third manual valve is disposed adjacent to the working pipeline; the first automatic valve is disposed between the pressure regulating valve and the third manual valve; and the gas supplier is operative to output a compressed gas to the working pipeline via the gas supply pipeline.

5. The cleaning method according to claim 1, wherein the air blade port is a long strip-shaped opening; orientations in which the air blade port and the working pipeline are disposed are consistent; and a length of the air blade port is greater than a length of the glass substrate in a direction corresponding to the air blade port, and is smaller than a length of the working pipeline.

6. The cleaning method according to claim 1, wherein the operating state includes a substrate loaded state; and in response to the detector detecting that the machine table is in the substrate loaded state, the cleaning method comprises:

outputting, by the detector, the respective control signal to the first automatic valve to open the gas supplier; and outputting, by the detector, the respective control signal to the second automatic valve to close the liquid supplier, wherein the gas supplier is operative to convey a compressed gas to the working pipeline; wherein the compressed gas is blown to a surface of the glass substrate via the air blade port; and the compressed gas is operative to blow off a residual drug liquid on the glass substrate.

7. The cleaning method according to claim 3, wherein the operating state includes a no-load state; and in response to the detector detecting that the machine table is in the no-load state, the operation of controlling the first automatic valve and the second automatic valve according to the respective control signals to be opened or closed comprises:

outputting, by the detector, the respective control signal to the first automatic valve to close the gas supplier; and
   outputting, by the detector, the respective control signal to the second automatic valve to open the liquid supplier,
   wherein the first manual valve is in a closed state, and wherein the second liquid supplier is operative to convey a second feed liquid to the working pipeline, the second feed liquid is flowed to the machine table from the group of through holes defined in the side of the second pipeline adjacent to the machine table, wherein the second feed liquid is deionized water.

8. The cleaning method according to claim 6, wherein the drug liquid comprises an etching liquid.

9. The cleaning method according to claim 6, wherein the compressed gas comprises compressed air.

10. The cleaning method according to claim 7, wherein a temperature of the deionized water is 35° C. to 45° C.

\* \* \* \* \*